United States Patent [19]

Kobayashi et al.

[11] 3,786,450

[45] Jan. 15, 1974

[54] MAGNETIC THIN FILM PLATED WIRE MEMORY

[75] Inventors: Seihin Kobayashi; Michihiro Torii; Takehiko Jojima, all of Shizuoka-ken, Japan

[73] Assignee: Fuji Denki Kagaku Kabushiki Kaisha, Tokyo, Japan

[22] Filed: Aug. 24, 1971

[21] Appl. No.: 174,359

[30] Foreign Application Priority Data

Aug. 29, 1970 Japan ............................ 45/75719

[52] U.S. Cl. 340/174 PW, 340/174 HP, 340/174 M, 340/174 VA, 340/174 TF

[51] Int. Cl. ...................... G11c 11/04, G11c 11/14

[58] Field of Search ............... 340/174 BC, 174 PW, 340/174 VA, 174 JA

[56] References Cited

UNITED STATES PATENTS

| | | | |
|---|---|---|---|
| 3,653,007 | 3/1972 | Murakami et al. | 340/174 BC |
| 3,623,032 | 11/1971 | Schapira | 340/174 BC |
| 3,449,731 | 6/1969 | Chow | 340/174 PW |
| 3,460,113 | 8/1969 | Maeda | 340/174 VA |

*Primary Examiner*—James W. Moffitt
*Attorney*—Fleit, Gipple & Jacobson

[57] ABSTRACT

A magnetic thin film plated wire memory is provided which comprises a word plane provided with a number of parallel word wires, a digit plane having a conductive plate provided with parallel grooves and a number of digit wires each covered with a magnetic thin film and snugly disposed within said grooves with an electrical insulation therebetween, said word plane and digit plane being laminated with each other such that the word wires and digit wires face and intersect at right angles with each other, said word wires being connected at their one ends to said conductive plate, whereby when one of said word wires are selected, a returning electric current flowing through said conductive plate is magnetically coupled with said digit wires.

3 Claims, 4 Drawing Figures

PATENTED JAN 15 1974 3,786,450

INVENTORS
Seihin Kobayashi
Michihiro Torii
Takehiko Jojima
BY
Fleit, Gipple & Jacobson ATTORNEYS

MAGNETIC THIN FILM PLATED WIRE MEMORY

This invention relates to a magnetic thin film plated wire memory to be employed as an internal memory device for information processor and the like.

Conventionally, a magnetic thin film memory of the kind has been produced by forming spot-shaped magnetic thin film elements on a substrate of glass by vacuum evaporation of permalloy and arranging word wires and digit-sense wires so as to intersect at right angles with each other on the substrate in contact with the elements. It is also known to produce another type of magnetic thin film memory by forming toroidal digit-sense wires having uniaxial magnetic anisotropy by electric plating of permalloy on conductive bodies and arranging word wires at right angles with the digit-sense wires.

In either case, since the word wire and the digit wire form discontinuously closed flux path or open flux path, a constant of electro-magnetic coupling therebetween is very small and, in other words, magnetic resistance of the word wires becomes very large. Accordingly, in the plated wire memory of the type in which each single wire contains multiple memory elements, interactions between the word wires tend to arise with the results that a so-called creeping may occur which will disturb the stability of memory. To avoid such creeping, the space between the word wires has necessarily been wide in the conventional memories.

In order to improve such defects, it has been proposed to have a so-called magnetic keeper directly contacted with the back side of the word wires, or to provide woven magnetic keeping wires at the back side of the word wires. However, since various types of disturb records tend to be added, the space between the adjacent word wires has to be more than 1mm in most practical memories.

On the other hand, the magnetic thin film memory element made of permalloy which compositions are selected so as to minimize the constant of magnetostriction has a thickness below 1,000A–1 micrometer to attain desired magnetic characteristics and, thereby, is very weak. In addition, it is very difficult to continuously keep the constant of magnetostriction minimum.

In order to rise the above-mentioned constant of the magnetic coupling without deforming such weak thin film, it is known that wires each forming memory elements are threaded through elongated small holes of insulated members to which word wires are strung above and below to intersect at right angles. Also it is known that, as if a woven fabric is knitted by wefts and warps, steel wires as the wefts and word wires and magnetic keeping wires as the warps are knitted. Then, the steel wires are extracted and substituted by memory wires.

In these structures, word wires can be strung above and below the memory wires and come close thereto to such an extent as not to apply stress to the memory wires. However, such extent is rather wide.

Furthermore, though the most effective advantage of the magnetic thin film memory of the kind is that the appearance of output wave due to the switching of the thin film elements is extremely fast, on the other hand, it provides very serious problem how to physically construct the memories since an output signal is generated at rising time of the read-out pulse. Above all, it is necessary that cosine factor of the word wire and the digit-sense wire is made zero, that electric conductive characteristic of the digit-sense wires and the word wires is improved to such an extent as to be treated as disturbed constant circuit, that characteristic impedance thereof is kept low, and that an induced voltage, which may arise on a non-energized digit wire when the adjacent digit wire is energized, is minimized.

It is not too much to say that any conventional magnetic thin film memory has satisfied the above requisites.

Accordingly, an object of the present invention is to provide a high-speed magnetic thin film memory which improves the above-mentioned defects and which has high packing density of memory elements.

According to the present invention, a magnetic thin film plated wire memory is provided which ocmprises a word plane provided with a number of parallel word wires, a digit plane having a conductive plate provided with parallel grooves and a number of digit wires each covered with a magnetic thin film and snugly disposed within said grooves with an electrical insulation therebetween, said word plane and digit plane being laminated with each other such that the word wires and digit wires face and intersect at right angles with each other, said word wires being connected at their one ends to said conductive plate, whereby when one of said word wires are selected, a returning electric current flowing through said conductive plate is magnetically coupled with said digit wires.

The aforementioned and other objects and features of the invention will be apparent from the following detailed description of specific embodiments thereof, when read in conjunction with the accompanying drawings, in which.

Generally, an easy direction of magnetization of a magnetic film body can be selected to a circumferential direction or an axial direction thereof. In accordance with the direction of the easy axis, the memory element is determined to select its driving body and a sensing body. In the embodiment shown in Figures, the easy axis of magnetization is in the circumferential direction of magnetic film bodies.

Figure 1:
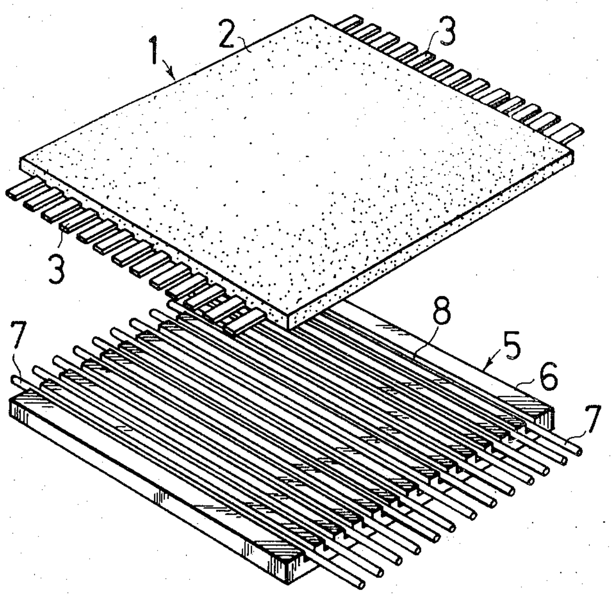
FIG. 1 is a perspective view showing a magnetic thin film plated wire memory prior to its assembly.

In figures, reference numeral 1 designates a word plane in which a plate-shaped member 2 for concentrating magnetic flux has a number of word wires 3 embedded in parallel in one side thereof. This plate-shaped member 2 is made of a mixture of ferromagnetic powder with macromolecular organic material, which mixture is formed to sheet shape and cut to a square shape as shown in FIG. 1. The plate-shaped member 2 has magnetic permeability of about 10$\mu$.

Figure 3:
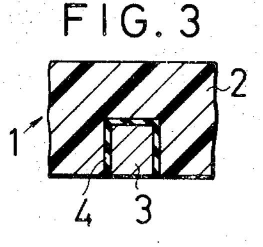
FIG. 3 is a sectional view showing a part of a word plane which part is different side from that of FIG. 2.

The word wire 3 embedded into the plate-shaped member 2 has a sectional shape of rectangular which lower side is exposed outside of the plate-shaped member as shown in FIG. 3, so that magnetic flux generated around the word wire is not dispersed but is concentrated effectively to the direction where the word wire is exposed. The word wire 3 which has good electrical conductivity may be directly embedded into the plate-shaped member or, alternatively, may be covered on its three surfaces embedded into the plate-shaped member with an electrically insulative layer 4 as shown in FIG. 3. Spaces between adjacent two word wires 3 are about 0.4mm.

Reference numeral 5 designates a digit plane comprising a sheet of conductive plate 6 and a number of digit wires 7 made of magnetic film bodies. The conductive plate 6 is of metal plate which one side opposing to the word plane 1 is provided with a number of parallel grooves 8. Within each groove 8 the digit wire 7 is snugly disposed to be electrically insulated from the conductive plate 6. To insure the electrical insulation therebetween, either the inner surface of the groove or the outer surface of the digit wire 7 is provided with electrical insulative film layer. In the embodiment shown in FIG. 2, an electrical insulative layer 9 is shown which is formed by homogeneously coating liquid resin of fluorine-rubber type on whole surface in the groove 8.

Figure 2:
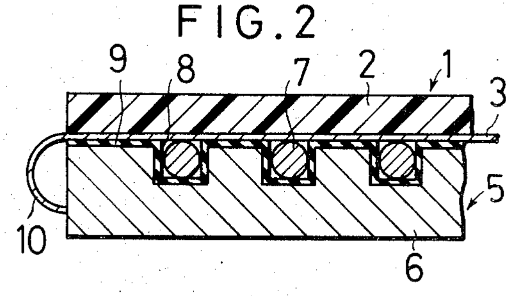
FIG. 2 is a sectional view showing main parts of the magnetic thin film plated wire memory assembled as shown in FIG. 1.
Figure 4:
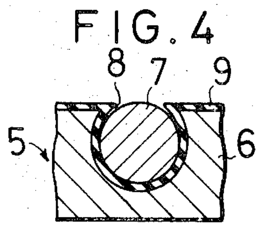
FIG. 4 is a sectional view showing a part of a digit plane assembled in accordance with another embodiment of the present invention.

It is desired that the grooves 8 are formed in the conductive plate with accurate dimension in order that the digit wires 7 disposed within the grooves 8 may hold a fixed relative position with respect to a top surface of the conductive plate 5. Furthermore, in order to attain high packing density of memory elements, it is desirable that the spaces between the grooves be as narrow as possible. In practice, it is possible to make accurate grooves spaced about 0.3mm with each other by a known technique of metal treatment. The groove may have a sectional shape which is different from or similar to that of the digit wire as shown in FIG. 2 or FIG. 4.

The word plane 1 is laminated upon the digit plane 5 in such a manner that the word wires 3 and digit wires 7 are opposed and intersected at right angles with each other. One end of each word wire 3 is bent as shown by reference numeral 10 in FIG. 2 and connected to the conductive plate 6 which constitutes the digit plane 5, while the other end of the word wire 3 is connected to a driving circuit for the word wire (not shown).

In operation, when an electric current is applied to a selected word wire 3, a returning electric current flows through the conductive plate 6 since the word wire 3 is connected at its one end 10 to the conductive plate 6. At this time, the returning electric current tends to flow along a path closest to the selected word wire, which phenomenon is a so-called image effect.

By utilizing such image effect, the present invention enables the space between the word wire 3 and the digit wire 7 to be minimum and also enables the returning electric current not to be dispersed but to be concentrically applied to the digit plane 5.

The following outstanding effects are obtained in he magnetic thin film memory according to the present invention.

a. The stray capacitance $C_s$ between the word wire and ground is made smaller, so that no charge and discharge due to $C_s$ occur when the word wire is selected. Consequently, noise is not generated on the digit wire 7 and the time cycle can be improved.

b. The spaces between the word wires 3 and the digit wires 7 can be minimum by laminating the word plane 1 upon the digit plane 5 to be in contact with each other, so that driving magnetic field is concentrated.

c. Very little induced noise is generated.

d. The magnetic flux is effectively concentrated by the plate 2 to the direction where the word wires are exposed, so that greater magnetic memory elements can be loaded in the present memory.

e. The word wire 3 is folded at its one end and connected to the conductive plate 6, so that the length of lead wires can be shorten to reduce word impedance.

f. Since the word plane 1 and the digit plane 5 are made of separate members, they can be manufactured separately and easily and, thereby, the present memory is suited for mass production.

g. When a trouble has occured in the memory, the defective memory element can be easily repaired or replaced by opening the laminated word plane 1 from the digit plane 5.

h. Compared with the conventional memory, the present memory has three times the packing density of memory elements, produces two and half times a greater output signal, and remarkably improves the ratio of S/N.

Though the present invention has been described with reference to the preferred embodiments thereof, many modifications and alternations may be made.

What is claimed is:

1. A magnetic thin film plated wire memory comprising a word plane having a plurality of parallel word wires, a digit plane including a conductive plate having a plurality of parallel grooves and a plurality of digit wires each covered with a magnetic thin film, one of said digit wires being snugly disposed within each of said grooves and a layer of electrical insulation being disposed between said grooves and said digit wires, said word plane and said digit plane being laminated together such that said word wires and said digit wires face each other and intersect at right angles with each other, said word wires having one of their ends connected to said conductive plate, whereby when a current is applied to one of said word wires a returning electric current is caused to flow through said conductive plate substantially underneath and parallel to said one of said word wires to which current is applied and to be magnetically coupled with said digit wires.

2. A magnetic thin film plated wire memory as claimed in claim 1, wherein said word wires are embedded in said word plane, said word plane is made mainly of ferromagnetic substance, and said word wires have one of their sides exposed to said digit plane.

3. A magnetic thin film plated wire memory as claimed in claim 2, wherein said word wires are insulated from said word plane by an electrical insulation layer provided therebetween.

* * * * *